(12) United States Patent
Rahkola

(10) Patent No.: US 7,993,622 B2
(45) Date of Patent: Aug. 9, 2011

(54) METHOD FOR PREPARING DITHIONITE

(75) Inventor: Risto Rahkola, Keikyä (FI)

(73) Assignee: Kemira OYJ (FI)

( * ) Notice: Subject to any disclaimer, the term of this patent is extended or adjusted under 35 U.S.C. 154(b) by 0 days.

(21) Appl. No.: 12/598,457

(22) PCT Filed: Apr. 25, 2008

(86) PCT No.: PCT/FI2008/050225
§ 371 (c)(1),
(2), (4) Date: Mar. 4, 2010

(87) PCT Pub. No.: WO2008/135631
PCT Pub. Date: Nov. 13, 2008

(65) Prior Publication Data
US 2010/0181531 A1  Jul. 22, 2010

(30) Foreign Application Priority Data

May 4, 2007 (FI) .................................. 20075317

(51) Int. Cl.
*C01B 17/66* (2006.01)

(52) U.S. Cl. ............................................. 423/515

(58) Field of Classification Search .............. 423/515
See application file for complete search history.

(56) References Cited

U.S. PATENT DOCUMENTS

| | | | | |
|---|---|---|---|---|
| 791,675 | A | * | 6/1905 | Deschamps .................. 423/515 |
| 1,472,828 | A | * | 11/1923 | Eustis ........................... 422/160 |
| 4,788,041 | A | | 11/1988 | Sanglet |
| 5,094,833 | A | | 3/1992 | Ko et al. |
| 5,098,679 | A | | 3/1992 | Knollmueller |
| 5,562,803 | A | | 10/1996 | Wang et al. |
| 2004/0000380 | A1 | | 1/2004 | Goda |

FOREIGN PATENT DOCUMENTS

| | | |
|---|---|---|
| EP | 0027369 A1 | 4/1981 |
| EP | 1375735 A1 | 1/2004 |
| EP | 1418269 A1 | 5/2004 |
| EP | 1524241 A1 | 4/2005 |
| WO | 8810334 A1 | 12/1988 |
| WO | 9220855 A1 | 11/1992 |
| WO | 9722749 A1 | 6/1997 |
| WO | 9856988 A1 | 12/1998 |
| WO | 2008135631 A1 | 11/2008 |

OTHER PUBLICATIONS

Wartik et al., "Reactions of Carbon Dioxide with Sodium and Lithium Borohydrides", J. Inorg. Nucl. Chem., 1958, vol. 7, pp. 404-411.

European Search Report dated Jun. 1, 2010 for Application No. 08761628.0-2124 / 2150489 PCT/FI2008050225, 6 pages.

Written Opinion of the International Searching Authority; International Application No. PCT/FI2008/050225 (7 pages), dated Jul. 28, 2009.

International Search Report; International Application No. PCT/FI2008/050225; Date of Mailing of ISR Jan. 8, 2008 (3 pages), dated Aug. 2008.

* cited by examiner

*Primary Examiner* — Timothy C Vanoy

(74) *Attorney, Agent, or Firm* — Cantor Colburn LLP

(57) ABSTRACT

The present invention relates to a method for preparing dithionite solution with a reaction wherein sodium bisulfite is reduced with sodium borohydride solution to obtain dithionite, wherein the rise of the pH of the solution is prevented by adjusting the pH with carbon dioxide.

13 Claims, No Drawings

METHOD FOR PREPARING DITHIONITE

CROSS REFERENCE TO RELATED APPLICATIONS

This is a U.S. national stage of application No. PCT/FI2008/050225, filed on 25 Apr. 2008. Priority under 35 U.S.C. §119(a) and 35 U.S.C. §365(b) is claimed from Finland Patent Application No. 20075317, filed 4 May 2007, the disclosure of which is also incorporated herein by reference.

The present invention relates to a method for preparing dithionite solution by reaction wherein sodium bisulfite is reduced with sodium borohydride solution to obtain dithionite. More particularly the present invention relates to a method wherein the rise of the pH of the solution is prevented by adding carbon dioxide as a pH-adjusting agent.

BACKGROUND OF THE INVENTION

Dithionite (hydrosulfite) is an agent generally used in bleaching of different products, such as pulp and textiles, and in other subjects. Several methods for preparing dithionite are generally known in the art. Because the dithionite solution is relatively unstable, it is generally prepared just before use. Dry dithionite can be prepared by different methods and it is more stable than the solution, but flammable. However, it is more practical to prepare the dithionite in situ from liquid stable starting materials to avoid the handling of flammable or fluffy powder.

One method for preparing dithionite solution based on sodium borohydride is disclosed in U.S. Pat. No. 4,788,041, wherein the reaction equation is the following:

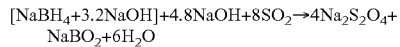

$$[NaBH_4+3.2NaOH]+4.8NaOH+8SO_2 \rightarrow 4Na_2S_2O_4+NaBO_2+6H_2O$$

Generally [NaBH$_4$+3.2NaOH] represents sodium borohydride solution containing about 12% NaBH$_4$, about 40% NaOH and about 48% water. One example of such generally used commercially available solution is Borino™ (Finnish Chemicals Oy).

It is important to carry out the reaction in the right pH, because at too acidic range the yield is decreased because of the hydrolysis of borohydride and on the other hand at too high pH the yield of the main reaction is decreased. In U.S. Pat. No. 4,788,041 it is mentioned that the optimal pH is 5.5-6. According to said publication the hydrolysis of the borohydride can be decreased by lowering the reaction temperature to the range of 7-10° C.

In EP 1524241 it is disclosed that lye and a part of the sulfur dioxide can be introduced as ready sodium bisulfite solution, which has been prepared from sulfur-containing gases as follows:

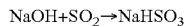

$$NaOH+SO_2 \rightarrow NaHSO_3$$

If sodium bisulfite is used in the preparation of sodium dithionite, the lye of the sodium borohydride solution must be neutralized in order to obtain a pH low enough for the reaction. In US2004/0000380 and WO 88/10334 phosphoric acid is provided as a solution for this. As a disadvantage in these processes different kinds of phosphates are formed, which are not desired for example in the view of paper making. Furthermore, in the examples of the publication sulfuric acid is used, but then sulfate is obtained as a useless by-product. For example in paper machine environment sulfur causes corrosion and problems in the prevention of slime.

U.S. Pat. No. 5,562,803 discloses a multi-phase bleaching method of de-inked recycled pulp, wherein the pH is adjusted between the phases with acetic acid or other organic acids. Although it is not exactly preparation of dithionite, it is however formed in situ. The method is expensive and as a by-product organic compounds are formed, which among other things add biological oxygen consumption.

It is therefore necessary to further develop methods for preparing dithionite, in which methods no unwanted by-products are formed and wherein the good stability of reagents and reaction products is obtained. Further, it is desirable to develop economically advantageous methods.

BRIEF SUMMARY OF THE INVENTION

In the present invention it was surprisingly discovered that the pH of the reaction can be maintained on the proper level by using inexpensive and non-toxic carbon dioxide. It is known in the art that sodium borohydride reacts with carbon dioxide (see Wartik T., Pearson R. K., Reactions of Carbon Dioxide with Sodium and Lithium Borohydrides, J. Inorg. and Nucl. Chem. 1958 vol. 7 pp. 404-411) so the high yield of dithionite was unexpected.

The present invention provides a method for preparing dithionite solution with a reaction wherein sodium bisulfite is reduced with sodium borohydride solution to obtain dithionite, wherein the rise of the pH of the solution is prevented by adjusting the pH with carbon dioxide, preferably by liquid carbon dioxide. The dithionite solution may be prepared with the method separately, for example just before use, or it can be prepared in situ in the application.

One advantage of the present invention is that the use of toxic or harmful reagents, such as liquid of gaseous sulfur dioxide, sulfuric acid, mineral acids or organic acids, is avoided. When using such reagents there is generally for example a hazard of catastrophe.

Further another advantage of the present invention is that when comparing for example to sulfur dioxide the amount of carbon dioxide needed is lower, even though the unit price is approximately the same, thus obtaining cost savings.

Still another advantage of the present invention is that the carbonic acid formed from carbon dioxide is a weak acid, thus avoiding excessive hydrolysis of borohydride.

Still another advantage of the present invention is that as a by-product of the reaction sodium carbonate is formed which is known to increase the stability of the end product.

Still another advantage of the present invention is that by using carbon dioxide the temperature of the reaction can be lowered to decrease the hydrolysis of the borohydride.

DETAILED DESCRIPTION OF THE INVENTION

In the method of the present invention dithionite solution is prepared with a reaction, wherein sodium bisulfite is reduced with sodium borohydride solution to obtain dithionite. Generally the sodium borohydride solution used contains sodium borohydride and NaOH in aqueous solution. The concentration of the sodium borohydride may be in the range of 1-30% (w/w) and the concentration of NaOH generally in the range of 10-50% (w/w). The role of sodium hydroxide is to stabilize sodium borohydride. If the concentration of NaOH decreases too low, the sodium borohydride starts decomposing. WO 88/10334 discloses a sodium borohydride solution wherein the amount of sodium hydroxide is below 10%, yet preferably at least 2% (w/w). To the appropriate extent the concentration of NaOH may be then also in the range of 2-50% (w/w). One practical example of applicable sodium borohydride solution contains about 12% (w/w) sodium borohydride and about 40% (w/w) NaOH. Commercially such solution is available for example from the company Finnish Chemicals Oy with a trade name Borino™. The composition applicable to the method may also have been obtained by diluting or concentrating the above-mentioned or a similar solution.

Because of the sodium hydroxide contained by the sodium borohydride solution the pH thereof is very high, thus deteriorating the yield of the reaction. Because of this the pH must be adjusted during the reaction to a more optimal level, generally to pH 9 or below. In one embodiment the pH is adjusted to 8 or below. In another embodiment the pH is adjusted to 7 or below. To avoid the hydrolysis of the borohydride, the pH however must not be adjusted too low, for example not below 5.5. In one embodiment the pH is adjusted to range of 6.5-7.5.

In the present invention the rise of the pH of the solution is prevented by adjusting the pH with carbon dioxide. The carbon dioxide to be used may be in any applicable form, such as liquid, gas, absorbed in aqueous solution or in the form of dry ice. In practice the liquid carbon dioxide is preferred, because carbon dioxide is generally delivered in liquid form and it is also cost efficient. Also the contact time to neutralize strong base is short when using liquid carbon dioxide thus greatly improving the yield of dithionite. Gaseous carbon dioxide may also be used especially when it can be fed to a high amount of (recycled) solution as very little bubbles. The carbon dioxide may be delivered to the reaction by any applicable means known by a person skilled in the art. Generally the carbon dioxide is delivered to the solution during the reaction wherein the dithionite is formed.

The reaction occurring in the method of the present invention in generally of the following form:

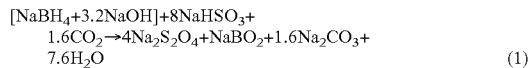

$$[NaBH_4 + 3.2NaOH] + 8NaHSO_3 + 1.6CO_2 \rightarrow 4Na_2S_2O_4 + NaBO_2 + 1.6Na_2CO_3 + 7.6H_2O \quad (1)$$

Reactions for preparing dithionite known in the art are e.g. the following ones:

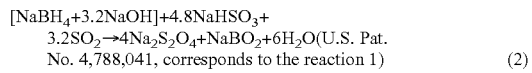

$$[NaBH_4 + 3.2NaOH] + 4.8NaHSO_3 + 3.2SO_2 \rightarrow 4Na_2S_2O_4 + NaBO_2 + 6H_2O \text{ (U.S. Pat. No. 4,788,041, corresponds to the reaction 1)} \quad (2)$$

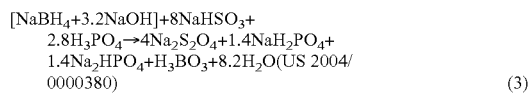

$$[NaBH_4 + 3.2NaOH] + 8NaHSO_3 + 2.8H_3PO_4 \rightarrow 4Na_2S_2O_4 + 1.4NaH_2PO_4 + 1.4Na_2HPO_4 + H_3BO_3 + 8.2H_2O \text{ (US 2004/0000380)} \quad (3)$$

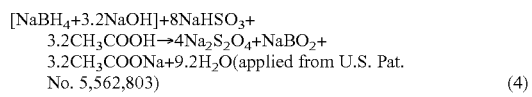

$$[NaBH_4 + 3.2NaOH] + 8NaHSO_3 + 3.2CH_3COOH \rightarrow 4Na_2S_2O_4 + NaBO_2 + 3.2CH_3COONa + 9.2H_2O \text{ (applied from U.S. Pat. No. 5,562,803)} \quad (4)$$

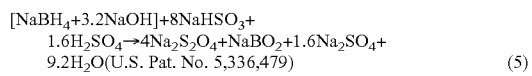

$$[NaBH_4 + 3.2NaOH] + 8NaHSO_3 + 1.6H_2SO_4 \rightarrow 4Na_2S_2O_4 + NaBO_2 + 1.6Na_2SO_4 + 9.2H_2O \text{ (U.S. Pat. No. 5,336,479)} \quad (5)$$

The theoretical amount of acid required to neutralize the lye can be calculated from the reaction equations, calculated per 1 kg of lye:

| | |
|---|---|
| $CO_2$ | 0.55 kg |
| $SO_2$ | 1.60 kg (Note: 40% less sodium bisulfite is required when compared to other reactions) |
| $H_3PO_3$ | 2.14 kg |
| $CH_3COOH$ | 1.50 kg |
| $H_2SO_4$ | 1.23 kg |

Here it can be seen that the required amount of carbon dioxide is far less than other acids, although when compared for example to sulfur dioxide the unit price is approximately the same.

To decrease the hydrolysis of sodium borohydride it is preferable to lower the temperature of the reaction. Generally the temperature if lowered to range of 15° C. or below. In one embodiment the temperature is lowered to the range of 10° C. or below, such as to 1-10° C. In one embodiment of the invention the temperature is lowered by carbon dioxide. The carbon dioxide to be used here can be in any applicable form. For example the temperature of liquid carbon dioxide is about −78.4° C. The solubility of carbon dioxide into water is weak in normal pressure so it is preferable to bring the carbon dioxide to the application as pressurized liquid. The best solubility and efficiency would be achieved if the reactor would be pressurized too.

The reaction can be carried out separately from the target application of the dithionite solution, and the dithionite obtained will be brought to the target after preparation. The reaction can be carried out also in situ in the target application of the dithionite solution. There are several target applications, such as the bleaching process of mechanical or chemical pulp; treatment of textiles, glue, gelatin, leather, soap, oils, food products, photographic equipment and chemical oxygen removal agents, such as color bleaching; treatment of inorganic materials, such as clay, gypsum or pigments; or the cleaning of equipment. When the reaction is carried out in situ and thus the dithionite obtained is used immediately, the reagents or the dithionite needs not to be as stabile as when prepared separately and therefore for example the amount of lye can be lowered or the temperature needs not to be lowered as much.

Next the invention will be illustrated by non-limiting examples.

EXAMPLES

Example 1

Sodium Dithionite Generation by pH Adjustment with $CO_2$

The example was performed in a semi-batch reactor made of stainless steel equipped with a magnetic stirrer. In order to keep the temperature constant, a cooling thermostat and a cooling coil around the reactor was used. The liquid volume of the reactor was 230 ml and the stirring speed was 350 rpm in all experiments.

Borino ($NaBH_4$ 12%, NaOH 40%) was diluted to 1:5 (Borino:water) and $NaHSO_3$ (38-40%) was diluted to 1:1.5 ($NaHSO_3$:water). Borino and $NaHSO_3$ were cooled to about 0° C. and introduced to the reactor by two different solenoid metering pumps. pH of the solution was controlled by liquid $CO_2$ and pressure was kept at 5 bar. During the normal one hour run samples were taken at some intervals of time. Because sodium dithionite decomposition is rapid, the titration was done immediately after taking the sample. All the experiments were done in stoichiometric ratio and the yield was calculated from analyzed dithionite compared to the theoretical value.

In this example the residence time varied between 4 and 12 minutes. The results are presented in Table 1.

TABLE 1

| Residence time (min) | pH | Temperature (°C.) | Yield (%) |
|---|---|---|---|
| 4 | 7.00 | 17 | 57.5 |
| 4 | 7.50 | 15.5 | 73.3 |

TABLE 1-continued

| Residence time (min) | pH | Temperature (°C.) | Yield (%) |
|---|---|---|---|
| 4 | 7.65 | 17 | 68.4 |
| 4 | 8.00 | 16 | 50.4 |
| 4 | 8.10 | 17 | 49.5 |
| 6 | 6.74 | 17 | 68.5 |
| 6 | 6.79 | 14 | 71.1 |
| 8 | 6.80 | 12.5 | 80.1 |
| 8 | 6.81 | 17 | 80.0 |
| 8 | 7.00 | 12 | 78.7 |
| 8 | 7.55 | 11.5 | 78.3 |
| 8 | 8.00 | 11 | 56.3 |
| 10 | 6.80 | 11 | 72.9 |
| 10 | 6.83 | 18 | 71.0 |
| 12 | 6.56 | 10 | 72.4 |
| 12 | 6.67 | 11 | 77.4 |
| 12 | 6.81 | 18 | 68.0 |
| 12 | 7.00 | 10 | 70.1 |
| 12 | 7.50 | 9 | 58.9 |
| 12 | 7.65 | 9 | 52.5 |
| 12 | 7.95 | 9 | 52.3 |

Example 2

Sodium Dithionite Generation without pH Adjustment

In this example the procedure was as in example 1, but pH was not adjusted at all. The result of example 2 is presented in Table 2.

TABLE 2

| Residence time (min) | pH | Temperature (°C.) | Yield (%) |
|---|---|---|---|
| 8 | 8.5 | 11 | 44 |

Example 3

Sodium Dithionite Generation by pH Adjustment with Sulfuric Acid

In this example the procedure as described in example 1 was followed otherwise, but two runs were done in atmospheric pressure and pH was adjusted by 30% sulfuric acid instead of carbon dioxide. The results of comparative example are presented in Table 3.

TABLE 3

| Residence time (min) | pH | Temperature (°C.) | Yield (%) |
|---|---|---|---|
| 8 | 6.9 | 15 | 69.3 |
| 8 | 7 | 13 | 72 |

As seen in tables 1-2 the yield of sodium dithionite was highest at pH 6.8 when residence time is 8 minutes. Lowest possible pH value 6.5 could be reached with 12 minutes long residence time. Over 80% yield was unexpected good result when taking account high value of pH and reaction temperature. In the same conditions carbon dioxide worked much better than sulfuric acid which was also unpredicted. Probably the proceeding of the reaction is different and sodium carbonate can inhibit the decomposition of dithionite.

The invention claimed is:

1. A method for preparing dithionite solution, comprising reducing sodium bisulfite with sodium borohydride solution in the absence of liquid or gaseous sulfur dioxide to obtain dithionite, wherein a rise of the pH of the solution is prevented by adjusting the pH with carbon dioxide.

2. The method of claim 1, wherein the reducing the sodium bisulfite with sodium borohydride is carried out under pressure.

3. The method of claim 1, wherein the carbon dioxide is liquid carbon dioxide.

4. The method of claim 1, wherein the pH is adjusted to 9 or below.

5. The method of claim 4, wherein the pH is adjusted to 8 or below.

6. The method of claim 1, wherein the pH is adjusted to a range of 6.5-7.5.

7. The method of claim 1, wherein the reaction occurring is $(NaBH_4+3.2NaOH)+8NaHSO_3+1.6CO_2 \rightarrow 4Na_2S_2O_4+NaBO_2+1.6Na_2CO_3+7.6H_2O$.

8. The method of claim 1, wherein the sodium borohydride solution contains 1-30% (w/w) $NaBH_4$ and 10-50% (w/w) NaOH.

9. The method of claim 1, wherein the reaction temperature is lowered to decrease the hydrolysis of sodium borohydride.

10. The method of claim 9, wherein the reaction temperature is lowered to 10° C. or below.

11. The method of claim 9, wherein the reaction temperature is lowered by carbon dioxide.

12. The method of claim 1, wherein the reaction is carried out in situ in the application of the dithionite solution.

13. The method of claim 1, wherein the reaction is carried out separately from the target application of the dithionite solution.

* * * * *